United States Patent [19]
Beaussay et al.

[11] 3,824,598
[45] July 16, 1974

[54] APPARATUS FOR MAINTAINING ELECTRONIC EQUIPMENT IN AN AIRPLANE BELOW A CERTAIN TEMPERATURE

[75] Inventors: Guy Beaussay, La Celle; Jean François Morand, Paris; Pierre Rossignol, Colombes, all of France

[73] Assignee: Electronique Marcel Dessault, Paris, France

[22] Filed: Sept. 22, 1972

[21] Appl. No.: 291,369

[30] Foreign Application Priority Data
Sept. 28, 1971 France .............................. 71.34837

[52] U.S. Cl. ................. 343/705, 343/872, 165/104
[51] Int. Cl. .............................................. H01q 1/28
[58] Field of Search ........... 343/704, 720, 908, 705, 343/872; 165/104

[56] References Cited
UNITED STATES PATENTS
2,760,191   8/1956   Blackmer et al.................... 343/704

OTHER PUBLICATIONS
Skolnick, Introduction to Radar Systems, McGraw–Hill Book Co. 1962, p. 382, copy GR 222 Library.

*Primary Examiner*—Eli Lieberman
*Attorney, Agent, or Firm*—Synnestvedt & Lechner

[57] ABSTRACT

An apparatus for maintaining electronic equipment in an airplane below a certain temperature. The apparatus comprises an elongate cylindrical container with pointed end sections removably mounted on the container. A tank is located along the length of the container and contains a liquid with a high heat capacity. A beam having a U-section houses the electronic equipment. In the course of the flight, the heat generated by the electronic components and by the friction of the outside wall of the container against the air is absorbed by the liquid. The tank is provided with heat exchange tubes which can be connected to a cold fluid source when the plane is on the ground in order to bring the temperature of the liquid to ambient temperature or below. Expansion chambers are provided at the ends of the tank enabling the expansion of the liquid during flight.

1 Claim, 4 Drawing Figures

FIG. 2

PATENTED JUL 16 1974 3,824,598
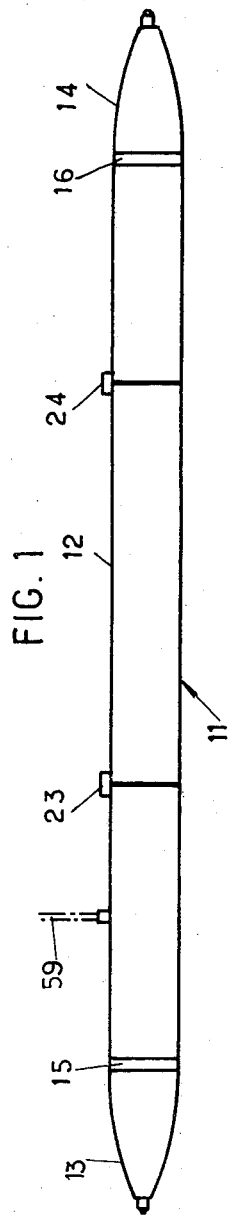
FIG. 1
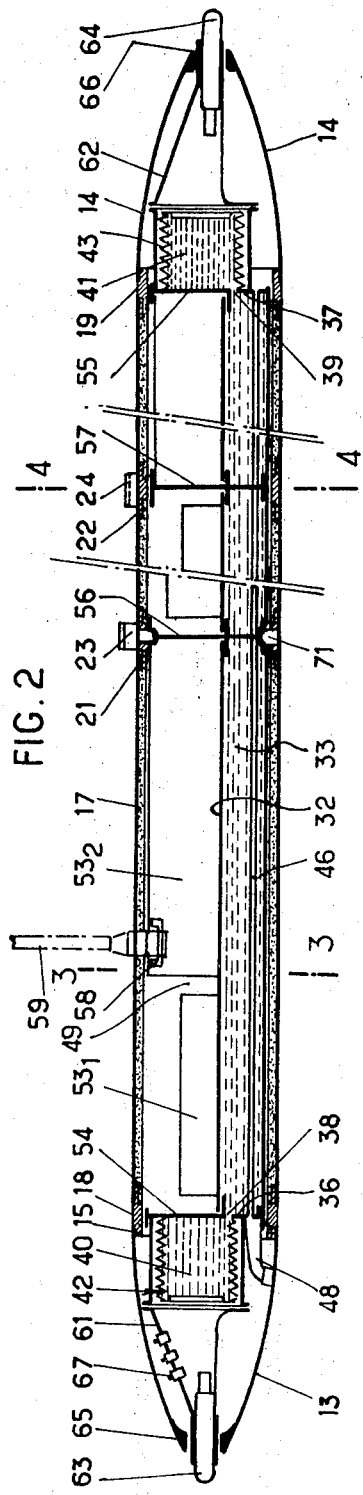
FIG. 2
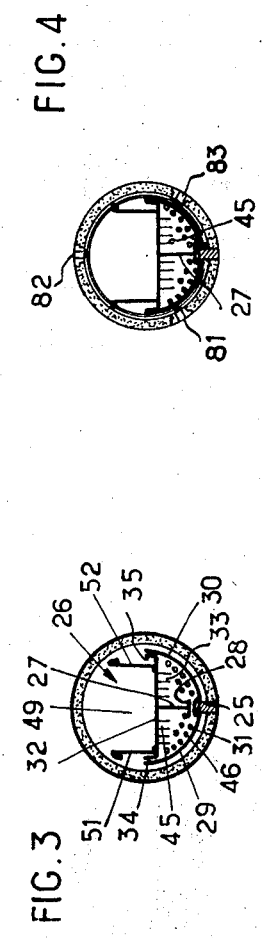
FIG. 4
FIG. 3

APPARATUS FOR MAINTAINING ELECTRONIC EQUIPMENT IN AN AIRPLANE BELOW A CERTAIN TEMPERATURE

The present invention concerns airborne apparatus for electronic equipment.

It is known that any electronic equipment operates satisfactorily at temperatures less than a predetermined value only, which, in spite of the care given in the construction of the equipment, may not exceed approximately 150° C at the present time. However, not only does the operation of certain components generate heat, but when the electronic equipment is intended for use in an airplane flying at high speeds, for example supersonic speeds at low or medium altitudes, there further is an increase in the temperature of the case containing the equipment due to the heating of its wall.

If in the case of airplanes of large capacity, or airplanes where production-cost is secondary, it is possible to provide an air-conditioning system in the enclosed space containing the electronic equipment, this is not however the case for airplanes which fly at high speeds and must comply to strict limitations of available space, so that use of an air-conditioning system is prevented, and to production-cost constraints because such systems are complicated and expensive.

The invention is based on the observation that in numerous cases the electronic equipment contained in the enclosed space must be protected from a rise in temperature resulting from supersonic flight which lasts only a relatively short time, according to the performance of the airplane.

In the apparatus according to the invention, a container with insulated walls encloses the electronic equipment and a structure supporting the equipment is in relation of heat conduction with a medium having a high thermal inertia the heat capacity of said medium being such that during a mission, the length of which depends on the performance of the airplane, the heat generated by the supersonic movement of the container in ambient air and by the operation of certain elements of the electronic equipment as well, can be absorbed by the medium within adequate limits so that the temperature of the equipment remains less than a value above which it would be damaged. Means are provided for cooling said medium, but in principle adapted to be operated only between missions, that is when the airplane is on the ground, so that no complexity is added to the construction of the apparatus.

According to one embodiment, the electronic equipment unit is carried on a structural member, a beam or the like, removably mounted in a cylindrical body or envelope, so that it is possible to associate various electronic equipment to the insulated container and to readily replace defective electronic components.

The description which follows made by way of example refers to the accompanying drawings in which:

FIG. 1 is an elevation view of an apparatus according to the invention;

FIG. 2 is a longitudinal section on a larger scale;

FIG. 3 is a cross-section taken along the line 3—3 in FIG. 2; and

FIG. 4 is a cross-section taken along the line 4—4 in FIG. 2.

The airborne apparatus comprises a fuselage-shaped container 11 (FIG. 1) with a cylindrical body 12 and two pointed end sections 13 and 14, and means 15 and 16 for detachably connecting the ends. Such containers may be very elongated with a ratio of length to diameter greater than 20 making it even more difficult to evacuate heat therefrom. The inner surface of the body 12 is covered with a lining 17 (FIG. 2) of heat insulating material, preferably a foam material such as expanded polyurethane. The body 12 is reinforced by circular frame members at its ends 18, 19 and at intermediary locations 21 and 22 where means 23, 24 for attaching the body to the airplane are provided.

A longitudinal rail 25 (FIG. 3), preferably of insulating material, is secured to the cylindrical body 12 and extends from one end to the other along the lower part thereof, supported by the frame members 18, 19, 21 and 22.

The rail 25 acts as a guide for a slidable structure 26 that comprises an upright member 27 (FIGS. 3 and 4) with a concave shoe 28 for bearing on the rail 25. The semi-circular arms 29 and 30 extend on each side of the rail 15 and have a concave bottom 31 making with a platform 32 attached to the upright member 27 a substantially semi-circular tank 33, the platform 32 having flanges 34 and 35 to be linked with bottom 31.

The semi-circular tank 33 is filled with a liquid having a high heat capacity, for example a mixture of water and glycerol. The tank is closed at its ends by cross-partitions 36 and 37 having openings 38 and 39 for the communication of the tank 33 with the expansion chambers 40 and 41 having accordeon-like lateral walls 42 and 43.

Fins 45 extend down from the platform 32 into the liquid of the tank 33. The tank 33 is crossed by tubes 46 of a heat exchanger, the ends of the tubes being provided with connectors 48 for communication with a cold fluid source and draining means.

Longitudinal panels 51 and 52 (FIG. 3) are secured to the platform 32 and make therewith an elongate compartment 49 extending along the entire length of the structure, the compartment being adapted to receive the electronic equipment which may be divided up into a number of units, such as the ones shown at $53_1$, $53_2$, etc. (FIG. 2), said units being attached to the platform 32. The distribution of the units 53 on the platform 32 is preferably such that the generation of heat from the operation of certain electronic components is substantially uniform along the length of the platform 32.

End partitions or webs 54 and 55 and intermediary partitions or webs 56 and 57 are provided, the latter being in line with the frame members 18, 19 and 21, 22 reinforcing the cylindrical body 12.

The structure comprises means 58 for electrical connections with the airplane by means of a cable 59.

Beyond the chambers 40 and 41, the structure extends with substantially conical projections 61 and 62 for aiding to hold members provided to co-operate with the electronic equipment, for example radar antennas, 63 and 64 respectively, which slidably cross the pointed end sections 13 and 14 via apertures 65 and 66 at the tips thereof.

On one or both of the conical projections 61 and 62 inputs 67 are provided for introducing parameters or programs into the electronic equipment.

The structure is held relative to the container 11 advantageously by a swivel pin such as shown at 71 acting in line with a frame member such as 56 and also by locking means 81, 82, 83 (FIG. 4) located in a cross-section in alignment with the web 57 and enabling sliding of the structure ends relative to the cylindrical body in order to enable thermal expansion.

At the beginning of a mission or flight, the liquid contained in the tank is at ambient temperature or below. During the mission, when the airplane carrying the apparatus with electronic equipment flies at a high speed, including supersonic speeds, the compartment 49 inside the container 11 is protected from the heat generated by the friction of the air against the outer surface of the container by the heat insulating lining 17. As the mission is being carried out, the electronic components of the electronic equipment generate heat and this heat transferred by the platform 32 to the fins 45 is absorbed by the liquid contained in the tank 33. As the heat capacity of the liquid is high, the temperature rises relatively slowly. The amount of liquid contained in the tank 33 is determined through calculation so that for the longest ever possible mission under the most severe conditions, the temperature of the electronic components does not exceed the upper limit of the range of temperature for which the operation is satisfactory.

In the course of the flight the expansion of the liquid occurs without any problem by means of the chambers 40 and 41. Partitions or webs inside the tank prevent the displacement of the bulk of the liquid under the effect of inertia.

When the airplane has completed its mission and is on the ground, the temperature of the liquid may be brought very quickly to ambient temperature or below; in order to do this, one of the connectors 48 is hooked up to a cold fluid source which is advantageously compressed air, the other to a draining means. At the end of a relatively short period of time, of the order of a few minutes, the temperature of the liquid is once again at the desired low value. The apparatus is once again ready for a new mission.

If necessary, it is possible to replace the electronic equipment in the apparatus; to this end, it is enough to remove one of the pointed end sections 13 or 14 of the body, then, after releasing the locking means 81, 82, 83 and also the swivel pins 71, to slide the structure 26 holding the electronic equipment through the co-operation of the concave shoe 28 with the rail 25: the structure is then completely removed from the cylindrical body. The structure may be replaced by a new structure and the latter is once again secured with the body by the swivel pins 71 and locking means 81, 82 and 83.

The entire apparatus may be secured to the airplane very quickly by hanging it up. The apparatus may take the place of a missile carried by the airplane for example. Its diameter and length are of the same order of magnitude as a missile so that it is possible to equip an airplane with a missile at the end of one wing and with the apparatus according to the invention at the end of the other wing.

The equipment inside the container may include instruments other than those belonging to the electronics field as such, like infra-red radiation analysis apparatus or similar devices.

What is claimed is:

1. An apparatus for carrying in an airplane an electronic equipment adapted to be associated with a radar unit in the airplane, comprising an elongate container, means for attaching the container to the airplane, a heat-insulating lining disposed along the inner wall of said container, pointed end sections fixed to the ends of said container, an axial passage provided in at least one of said pointed end sections, a medium having a high heat capacity in said container, a support structure for the electronic equipment in relation of heat conductivity with said medium, means for electrically connecting the electronic equipment to the radar unit, and a radar antenna in the axial passage in the pointed end section.

* * * * *

UNITED STATES PATENT OFFICE
CERTIFICATE OF CORRECTION

Patent No. 3,824,598    Dated July 16, 1974

Inventor(s) Beaussay et al.

It is certified that error appears in the above-identified patent and that said Letters Patent are hereby corrected as shown below:

In the heading:

--[73] Assignee:   Electronique Marcel Dassault, Paris, France--

Signed and sealed this 1st day of April 1975.

(SEAL)
Attest:

RUTH C. MASON
Attesting Officer

C. MARSHALL DANN
Commissioner of Patents
and Trademarks